US009821755B2

United States Patent
Farooq et al.

(10) Patent No.: US 9,821,755 B2
(45) Date of Patent: Nov. 21, 2017

(54) HINGE FOR A VEHICLE HOOD

(71) Applicant: Ford Global Technologies, LLC, Dearborn, MI (US)

(72) Inventors: S. M. Iskander Farooq, Novi, MI (US); Srinivasan Sundararajan, Ann Arbor, MI (US); Mohammed Omar Faruque, Ann Arbor, MI (US); Sudip Sankar Bhattacharjee, Novi, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 48 days.

(21) Appl. No.: 15/010,365

(22) Filed: Jan. 29, 2016

(65) Prior Publication Data

US 2017/0217401 A1 Aug. 3, 2017

(51) Int. Cl.
| | |
|---|---|
| *B60R 21/38* | (2011.01) |
| *B60R 21/013* | (2006.01) |
| *B62D 25/12* | (2006.01) |
| *E05D 5/02* | (2006.01) |
| *B60R 21/00* | (2006.01) |
| *B60R 21/34* | (2011.01) |

(52) U.S. Cl.
CPC ............ *B60R 21/38* (2013.01); *B60R 21/013* (2013.01); *B62D 25/12* (2013.01); *E05D 5/0207* (2013.01); *B60R 2021/0048* (2013.01); *B60R 2021/343* (2013.01)

(58) Field of Classification Search
CPC .................. B60R 21/38; B60R 21/013; B60R 2021/0048; B60R 2021/343; B62D 25/12
See application file for complete search history.

(56) References Cited

U.S. PATENT DOCUMENTS

| | | | |
|---|---|---|---|
| 6,019,419 A | 2/2000 | Browne et al. | |
| 6,257,657 B1 | 7/2001 | Sasaki | |
| 6,439,330 B1 | 8/2002 | Paye | |
| 6,513,617 B2 | 2/2003 | Sasaki et al. | |
| 6,520,276 B2 | 2/2003 | Sasaki et al. | |
| 6,530,449 B2 | 3/2003 | Sasaki et al. | |
| 6,942,056 B2 | 9/2005 | Nadeau et al. | |
| 7,303,040 B2 | 12/2007 | Green et al. | |

(Continued)

FOREIGN PATENT DOCUMENTS

| | | | | |
|---|---|---|---|---|
| DE | 10055828 A1 | 5/2002 | | |
| DE | 102009040398 A1 * | 3/2011 | ............ | B60R 21/38 |

(Continued)

OTHER PUBLICATIONS

Koestler et al., Frame joint for vehicle cover, has frame joint lower part for connection at vehicle body, where frame joint upper part is provided for connection at vehicle cover, German Patent Office, DE 10 2009 040 398 A1, English Abstract.*

(Continued)

*Primary Examiner* — James A English
(74) *Attorney, Agent, or Firm* — Frank A. MacKenzie; Bejin Bieneman PLC

(57) ABSTRACT

A hinge for a hood of a vehicle includes a first bracket, a member coupled to and rotatable relative to the first bracket, and a second bracket coupled to and rotatable relative to the member. An actuator includes a base connected to the first bracket and a rod moveable relative to the base. The rod moves from a retracted position to an extended position in contact with the second bracket.

17 Claims, 9 Drawing Sheets

(56) References Cited

U.S. PATENT DOCUMENTS

| | | | |
|---|---|---|---|
| 7,475,752 | B2 | 1/2009 | Borg et al. |
| 7,506,716 | B1 | 3/2009 | Salmon et al. |
| 7,637,344 | B2 | 12/2009 | Park |
| 7,845,691 | B2 | 12/2010 | Sundararajan et al. |
| 8,398,125 | B2 | 3/2013 | Takahashi et al. |
| 8,490,735 | B2 | 7/2013 | Farooq et al. |
| 9,283,942 | B2 * | 3/2016 | Minato ................ B60T 13/662 |
| 2007/0074919 | A1 * | 4/2007 | Hirata .................... B62R 21/34 180/69.2 |
| 2008/0174124 | A1 * | 7/2008 | Takahashi ............... B60R 21/34 292/45 |
| 2010/0294584 | A1 * | 11/2010 | Yuasa .................... B60R 21/38 180/274 |
| 2012/0084942 | A1 * | 4/2012 | Mehta .................... B60R 21/38 16/223 |
| 2013/0001004 | A1 * | 1/2013 | Farooq ................... B60R 21/38 180/274 |
| 2016/0082919 | A1 * | 3/2016 | Farooq ................... B60R 21/38 180/271 |
| 2017/0036643 | A1 * | 2/2017 | Matsushima .......... B62D 25/08 |

FOREIGN PATENT DOCUMENTS

| | | | | |
|---|---|---|---|---|
| DE | 202013101518 U1 * | 4/2013 | ............. | B60R 21/38 |
| EP | 1880907 A1 | 1/2008 | | |
| EP | 2495140 A1 * | 9/2012 | ............. | B60R 21/38 |
| WO | 2004094204 A1 | 11/2004 | | |
| WO | 2008003402 A1 | 1/2008 | | |

OTHER PUBLICATIONS

Koestler et al., Frame joint for vehicle cover, has frame joint lower part for connection at vehicle body, where frame joint upper part is provided for connection at vehicle cover, German Patent Office, DE 10 2009 040 398 A1, Machine Translation of Description.*

Evrard, "Innovative Bonnet Active Actuator (B2A) for Pedestrian Protection", SNPE Materiaux Energetiques, France, Paper No. 11-0113 (7 pages).

"Pedestrian Protection", Euro NCAP, http://www.euroncap.com/Content-Web-Page/ed4ad09d-1d63-4b20-a2e3-39192518cf . . . Jun. 24, 2014, © 2014 Euro NCAP (2 pages).

* cited by examiner

HINGE FOR A VEHICLE HOOD

BACKGROUND

During a collision between a front end of a vehicle and a pedestrian, the pedestrian may be thrown against a hood of the vehicle. During this movement, the head of the pedestrian may contact the hood, and more specifically, may contact a rear portion of the hood adjacent a windshield of the vehicle. The hood is typically formed of a thin material, such as a thin metal. As such, the hood may deform to absorb energy from the head of the pedestrian to reduce the likelihood of head injury to the pedestrian. Vehicles may be tested for a Head Injury Criteria (HIC), which is a biomechanical test to calculate potential of head injury of a pedestrian during impact with a vehicle.

In some vehicles, space is limited between the hood and underlying components, e.g., engine components. As such, deformation of the hood during impact with the head of the pedestrian may be limited by the underlying components, i.e., the hood may collide with the underlying components during impact with the head of the pedestrian. In such vehicles, a device may be incorporated into a hinge of the hood to raise the rear portion of the hood when impact with a pedestrian is imminent. This increases the space between the hood and underlying components and reduces the likelihood that the underlying components interfere with the deformation of the hood. This may positively affect the HIC for the vehicle.

Such devices for raising the rear portion of the hood add complexity to the design of the vehicle. For example, these devices may be incorporated into a body structure of the vehicle. In such a case, the body structure must be specifically designed to accommodate the device. Further, since the body structure of various vehicle models may be different, the body structure of each model must be specifically designed for the device, which adds cost and time to the design of the vehicle. Some devices for raising the rear portion of the hood may add complexity to the operation of the hinge, which may increase cost and time to the design of the vehicle and may affect the ease of use and durability of the hinge.

As such, there remains an opportunity to develop an improved device for raising a rear portion of the hood when impact with a pedestrian is imminent.

DETAILED DESCRIPTION

Figure 1:
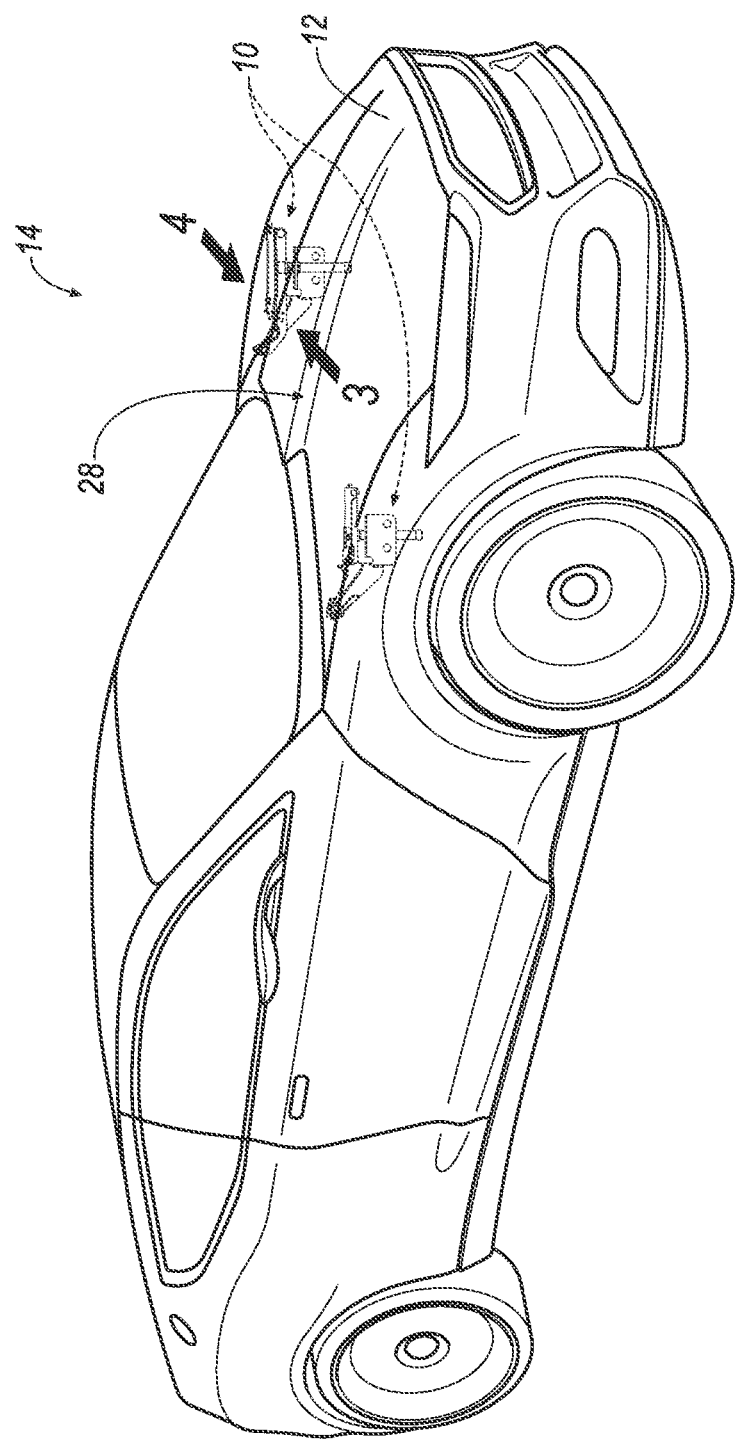
FIG. 1 is perspective view of a vehicle with a hinge for a hood of the vehicle shown in hidden lines and in an undeployed position.

With reference to the Figures, wherein like numerals indicate like parts throughout the several views, a hinge 10 for a hood 12 of a vehicle 14 includes a first bracket 16, a member 18 rotatably coupled to the first bracket 16, and a second bracket 20 rotatably coupled to the member 18. An actuator 22 includes a base 24 connected to the first bracket 16 and a rod 26 moveable relative to the base 24 from a retracted position to an extended position in contact with the second bracket 20 for rotating the second bracket 20 relative to the member 18.

Figure 2:
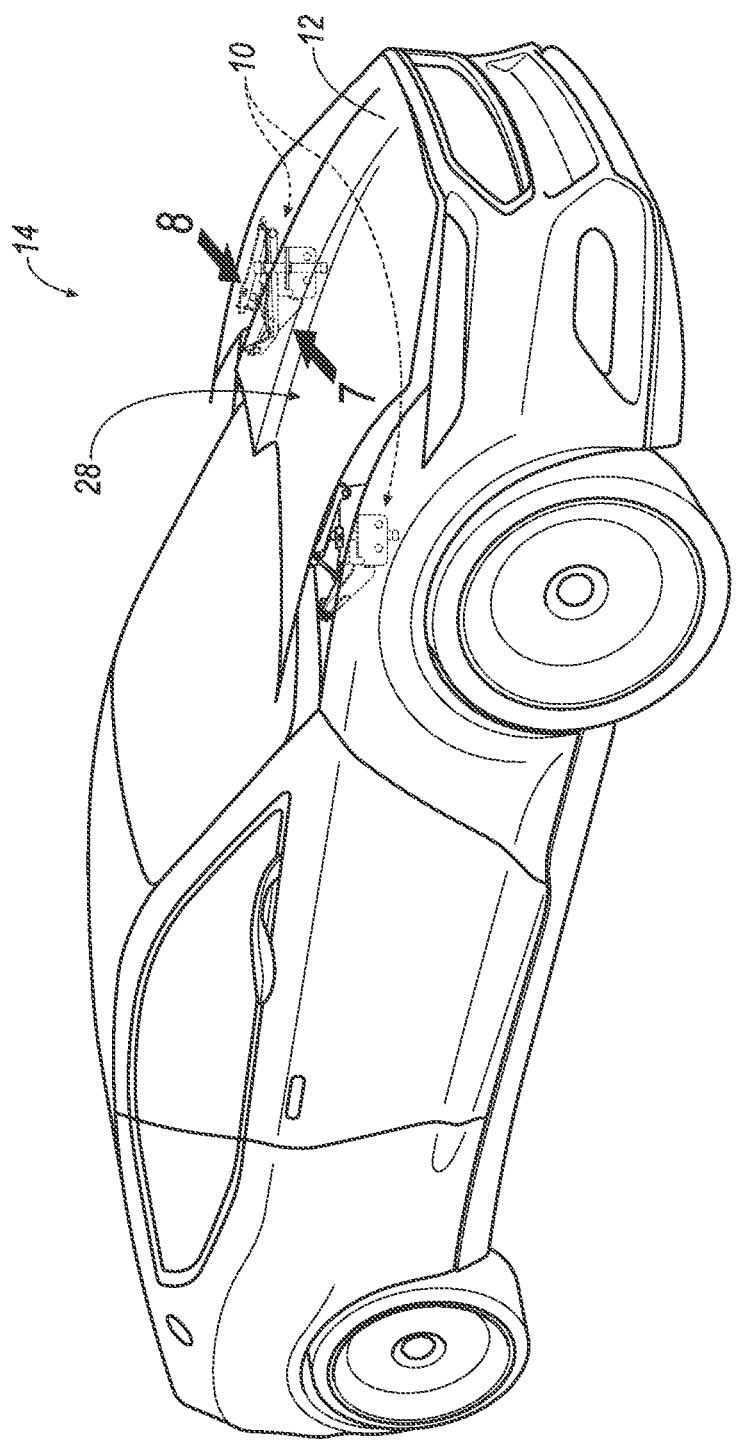
FIG. 2 is a perspective view of the vehicle with the hood hinge in a deployed position lifting the hood upwardly.

As set forth below, the actuator 22 may be activated, i.e., the rod 26 moves from the retracted position to the extended position, when a front-end impact with a pedestrian (not shown) is imminent. By contacting the second bracket 20 in the extended position, the rod 26 of the actuator 22 applies an upward force to the second bracket 20 to rotate the second bracket 20 relative to the member 18 and the first bracket 16. This forces a rear portion 28 of the hood 12 upwardly to increase space between the hood 12 and components (not shown), e.g. engine components, underlying the hood 12. In other words, the hinge 10 is in an undeployed position, as shown in FIG. 1, when the rod 26 of the actuator 22 is in the retracted position. As the rod 26 moves to the extended position, the hinge 10 moves to a deployed position, as shown in FIG. 2, e.g., the rear portion 28 of the hood 12 is moved upwardly to increase space between the hood 12 and components underlying the hood 12. This positively affects the head injury criteria (HIC) of the vehicle 14.

The complexity of the design of the hinge 10 is reduced by the rod 26 of the actuator 22 contacting the second bracket 20 in the extended position. Such a design eliminates intervening components between the actuator 22 and the second bracket 20 and allows for direct application of force to the second bracket 20.

Since the base 24 of the actuator 22 is connected to the first bracket 16 of the hinge 10, the hinge 10 is modular, i.e., is connected to the rest of the vehicle 14 as a single unit. As such, the hinge 10 may be used with a variety of different models and styles of vehicles 14 with relatively minor design variations to the hinge 10, e.g., dimensional variations. Extensive design to a body structure of the vehicle 14 is not required to accommodate the hinge 10.

The vehicle 14 may be any type of vehicle 14, for example, an automobile, as shown in the Figures. The vehicle 14 may include one or more hinges 10 for supporting the hood 12, e.g., two hinges 10 as shown in the Figures. As set forth further below, the hood 12 may rotate about the hinges 10 between a closed position, as shown in FIG. 1, and an open position, as shown in FIG. 6.

The hood 12, which may also be referred to as a bonnet, may be of any suitable configuration. The hood 12 may be formed, for example, of metal. The hood 12 may be configured to deform upon impact with a pedestrian to absorb energy during the impact to reduce the likelihood 12 of injury to the pedestrian.

The first bracket 16 is configured to mount the hinge 10 to the rest of the vehicle 14. For example, the first bracket 16 is configured to mount to a structure (not numbered), e.g., a body structure, of the vehicle 14. The first bracket 16 includes a connecting feature 30 for connecting to the structure of the vehicle 14. The connecting feature 30 may be, for example, one or more holes, as shown in the Figures, for receiving a bolt or other fastener that engages the structure of the vehicle 14. The holes may be slotted or may be round. Alternatively, the connecting feature may be any suitable feature for connecting the first bracket 16 to the rest of the vehicle 14.

Figure 6:
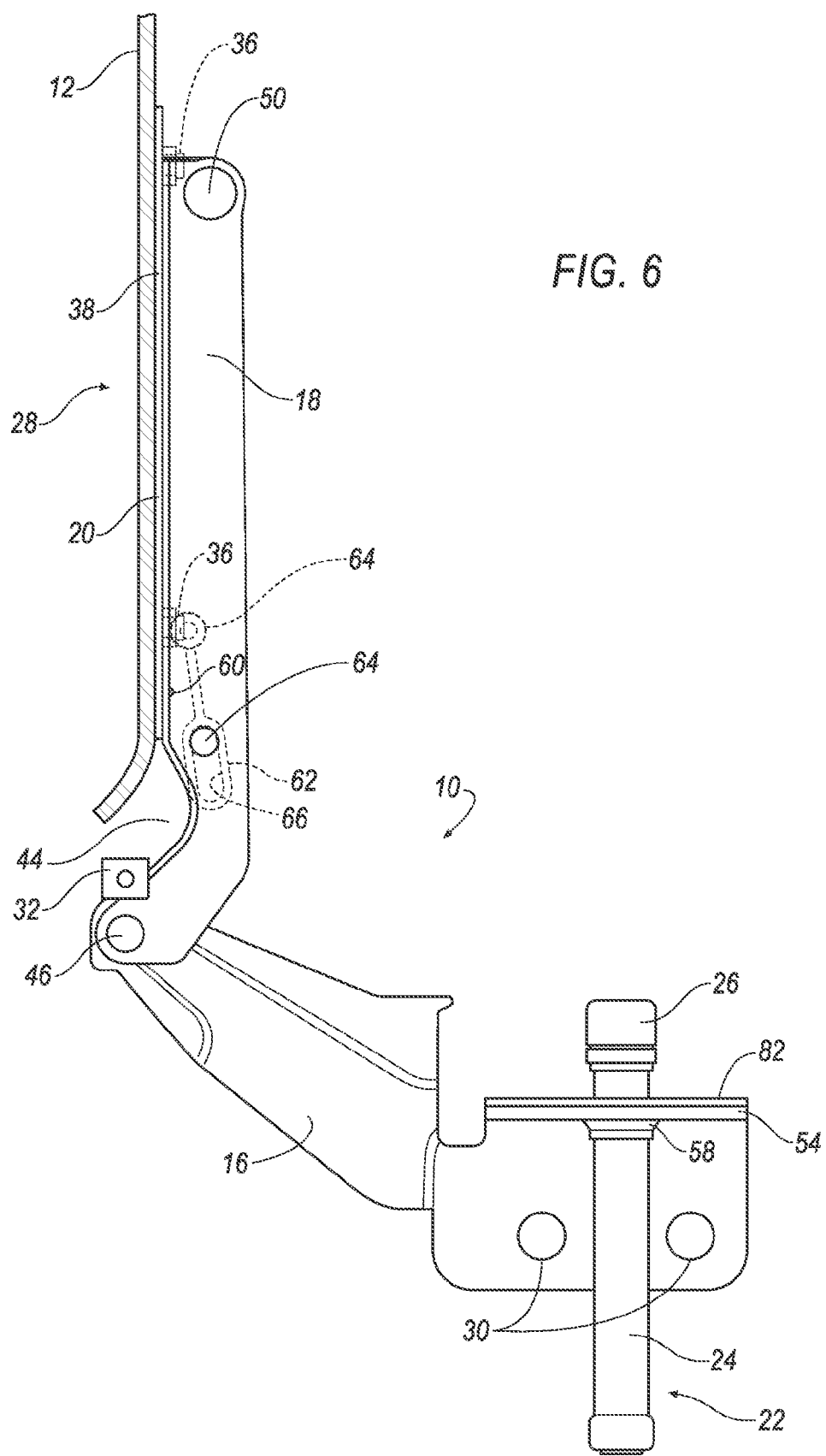
FIG. 6 is a side view of the hood hinge and a portion of the hood with the hood hinge in the open position.

The first bracket 16 may include a stop 32 configured to engage the member 18 when the hood 12/hinge 10 is in the open position, as shown in FIG. 6. The stop 32 may extend transversely to the member 18, e.g., transversely to the movement of the member 18 as the hood 12/hinge 10 move from the closed position to the open position. The stop 32 may abut the member 18 in the open position, as shown in FIG. 2.

The first bracket 16 may be formed of any suitable material. For example, the first bracket 16 may be formed of steel. The first bracket 16 may be of any suitable shape.

The second bracket 20 is configured to mount to the hood 12. The second bracket 20 includes a connecting feature 34 for connecting to the hood 12, e.g., a rear portion 28 of the hood 12. The connecting feature 34 may be, for example, one or more holes, as shown in the Figures, for receiving a bolt 36 or other fastener that engages the hood 12. The holes may be slotted or may be round. Alternatively, the connecting feature 34 may be any suitable feature for connecting the second bracket 20 to the hood 12.

The second bracket 20 may present a platform 38 for supporting the hood 12. The platform 38 may present a top surface 40 that is elongated and abuts the hood 12 for distributing the weight of the hood 12 on the second bracket 20. A bottom surface 42 of the platform 38 may engage the actuator 22 as the actuator 22 is actuated. Specifically, the rod 26 of the actuator 22 may contact the bottom surface 42 of the platform 38 and apply an upward force to the bottom surface 42 as the rod 26 moves to the extended position to move the hinge 10 to the deployed position, as shown in FIG. 2.

The second bracket 20 may be formed of any suitable material. For example, the second bracket 20 may be formed of steel. The second bracket 20 may be of any suitable shape.

Figure 3:
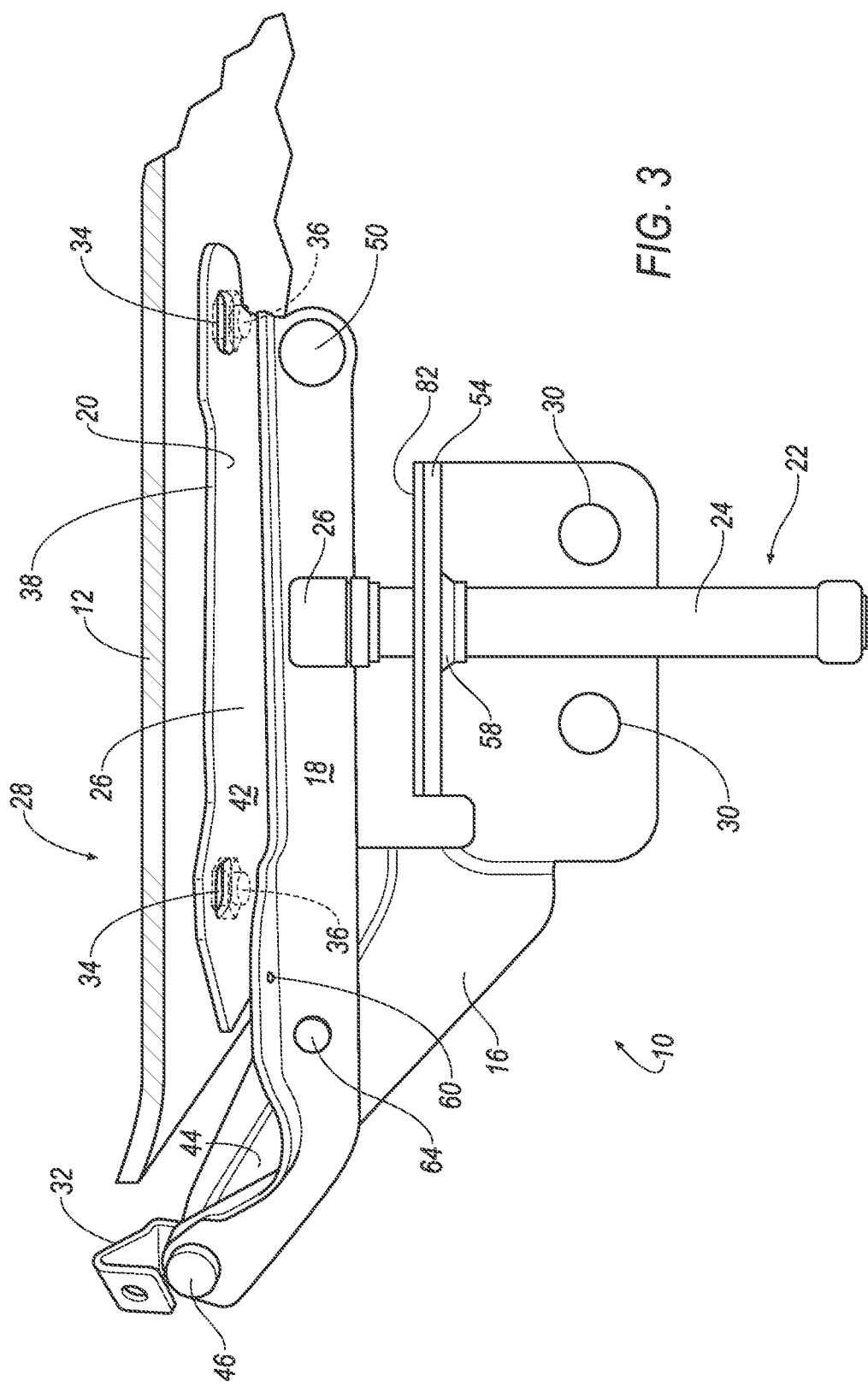
FIG. 3 is a side view of the hood hinge in the undeployed position and a portion of the hood along line 3 in FIG. 1.
Figure 4:
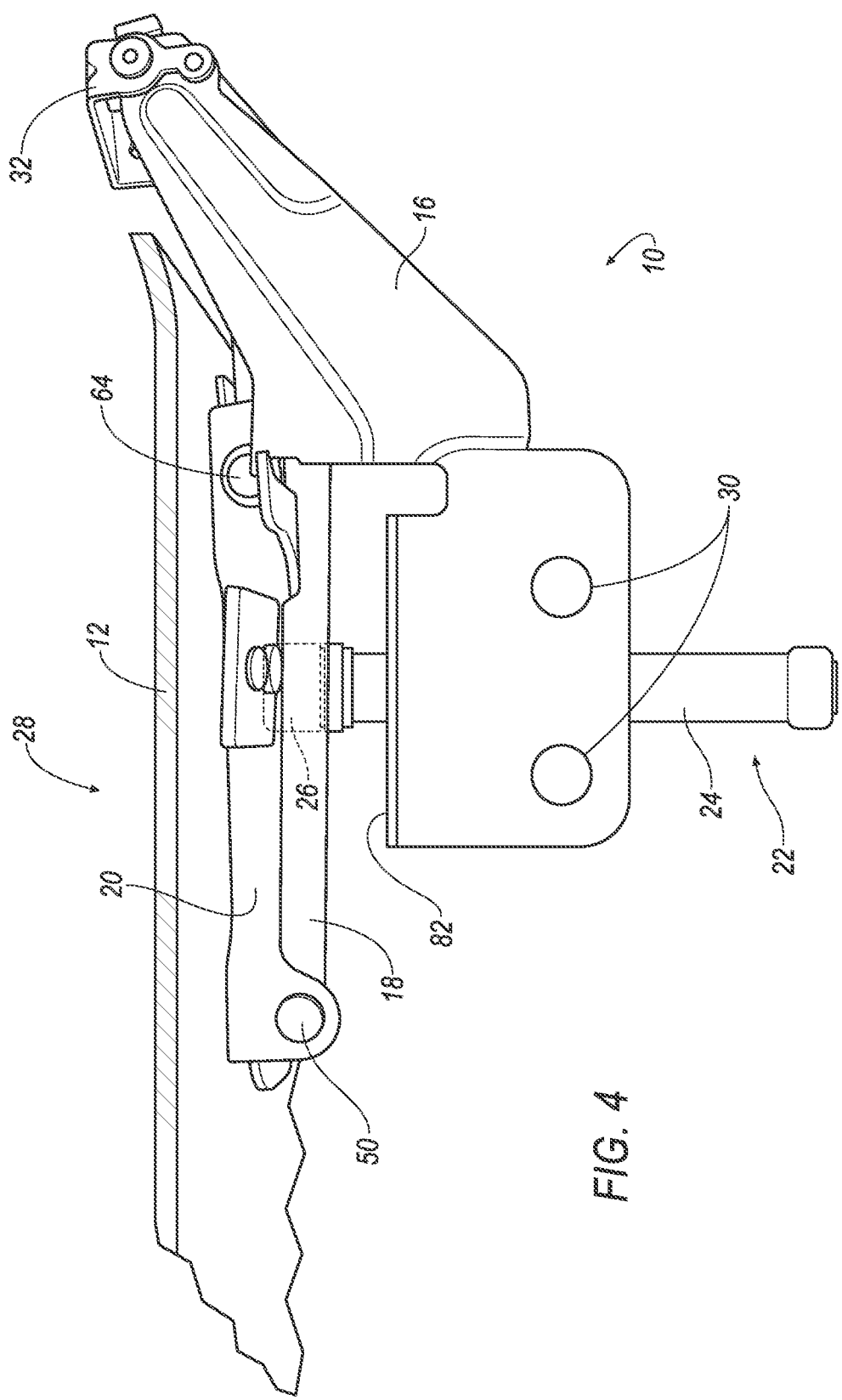
FIG. 4 is a side view of the hood hinge in the undeployed position and a portion of the hood along line 4 in FIG. 1.
Figure 7:
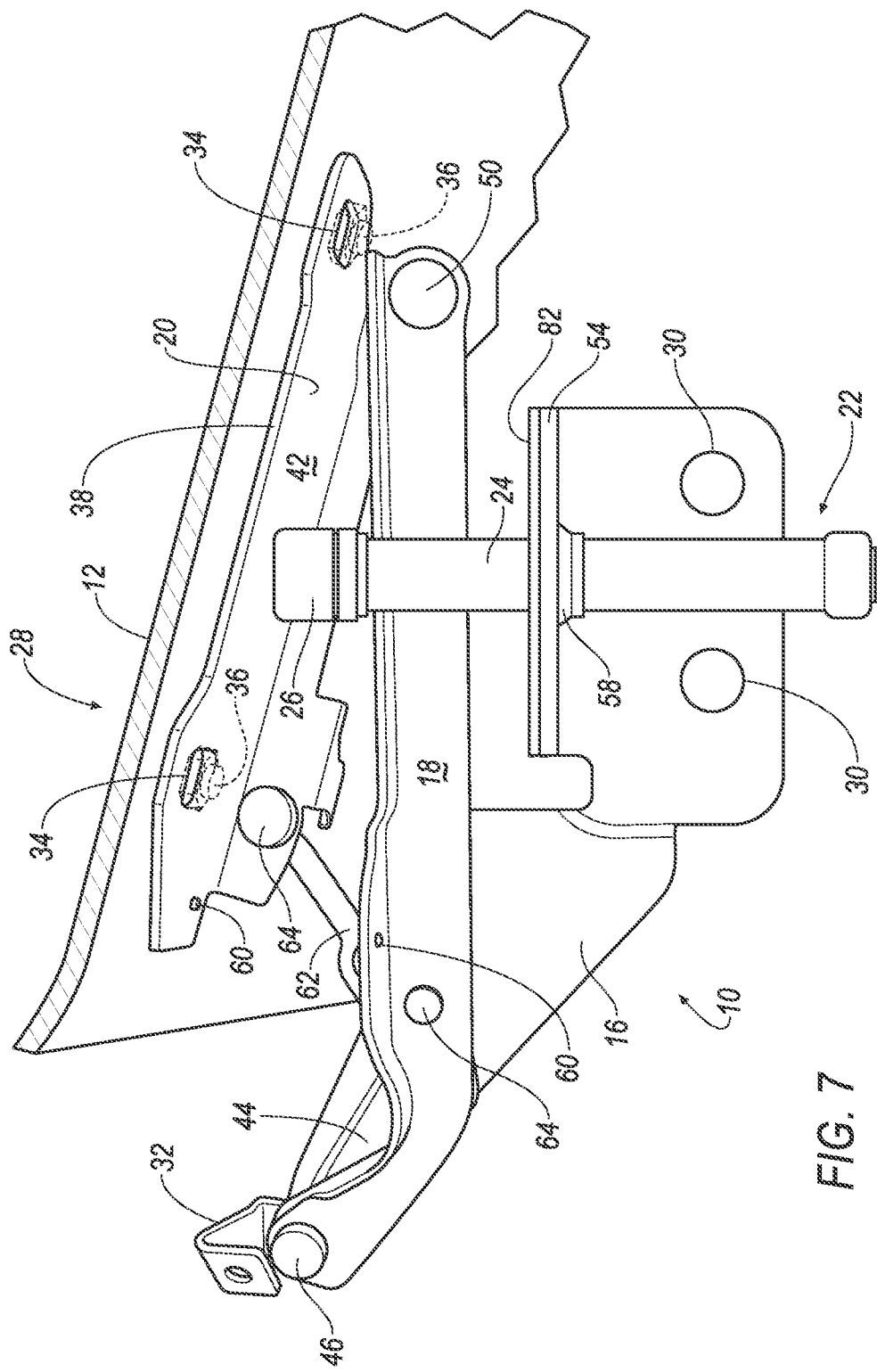
FIG. 7 is a side view of the hood hinge in the deployed position and a portion of the hood along line 7 of FIG. 2.
Figure 8:
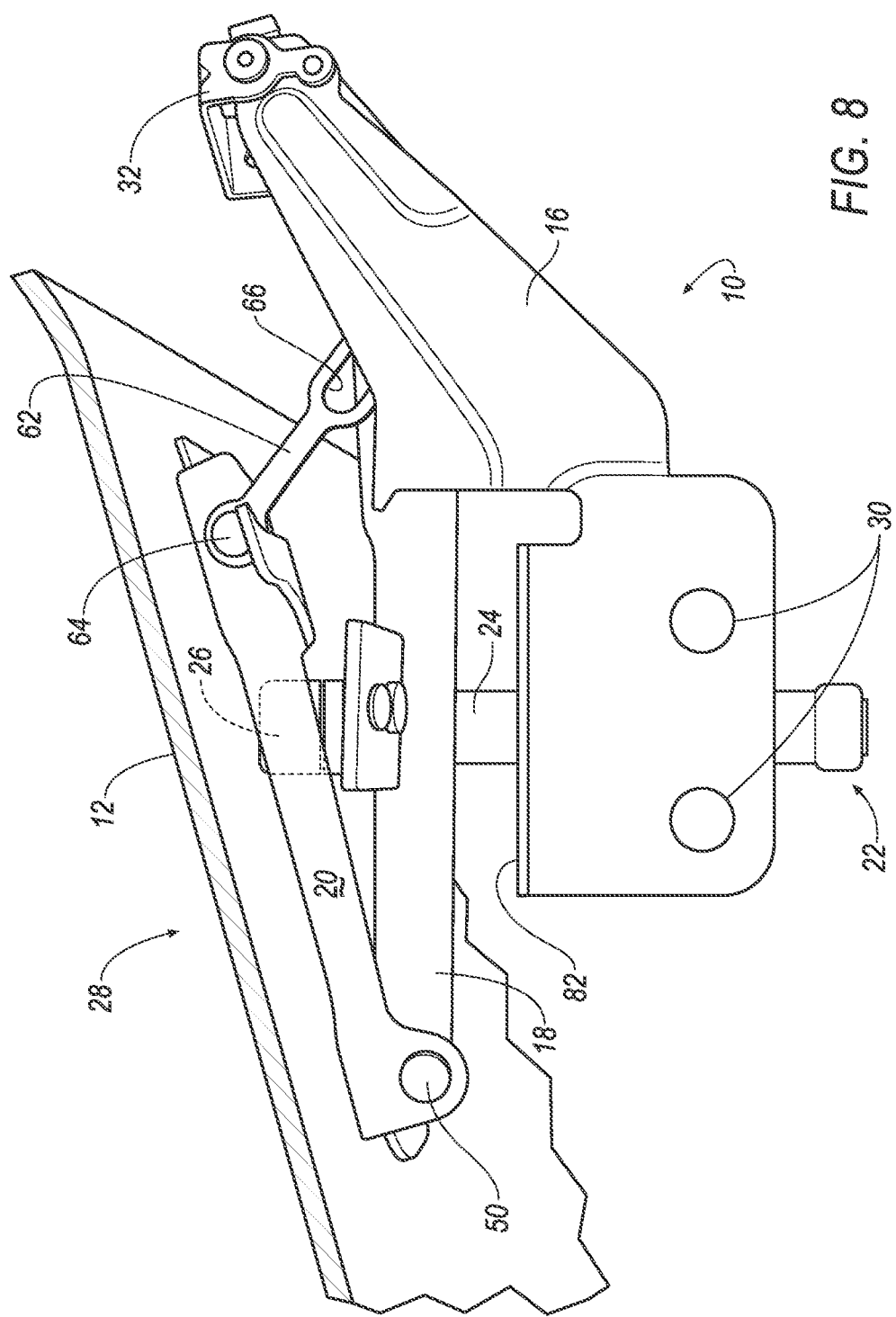
FIG. 8 is a side view of the hood hinge in the deployed position and a portion of the hood along line 8 of FIG. 2.

The member 18 extends between the first bracket 16 and the second bracket 20 and is rotatably coupled to the first bracket 16 and the second bracket 20. The member 18 connects the first bracket 16 to the second bracket 20. The member 18 rotates relative to the first bracket 16 and the second bracket 20 as the hood 12 moves from the closed position, as shown in FIGS. 3 and 4, to the open position, as shown in FIG. 6. The second bracket 20 rotates relative to the member 18 as the hood 12 moves from the undeployed position, as shown in FIGS. 3 and 4, to the deployed position, as shown in FIGS. 7 and 8.

The member 18 may define a cutout 44 for engaging the stop 32. The cutout 44 is configured to provide clearance between the member 18 and the first bracket 16 as the hinge 10 rotates from the open position to the closed position. A surface of the cutout 44 abuts the stop 32 when the hinge 10 is in the open position, as shown in FIG. 6.

The member 18 may be formed of any suitable material. For example, the member 18 may be formed of steel. The member 18 may be of any suitable shape.

Figure 5:
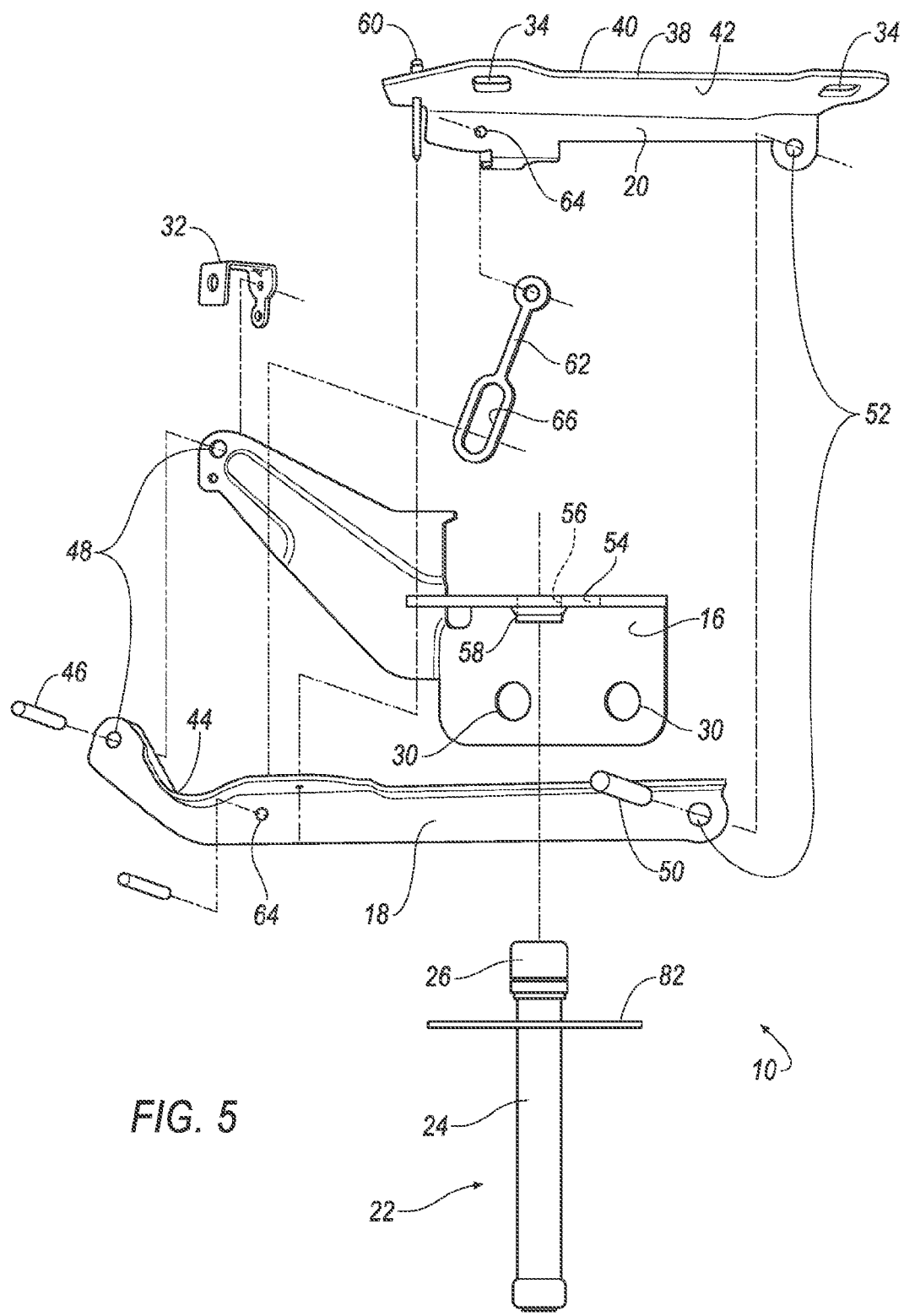
FIG. 5 is an exploded view of the hinge.

A rotatable joint 46 is disposed between the first bracket 16 and the member 18. The joint 46 extends from the first bracket 16 to the member 18. With reference to FIG. 5, the first bracket 16 and the member 18 may each define a hole 48 receiving the joint 46. The joint 46 may be rotatably engaged with each hole 48.

A rotatable joint 50 is disposed between the second bracket 20 and the member 18. The joint 50 extends from the second bracket 20 to the member 18. With reference to FIG. 5, the second bracket 20 and the member 18 may each define a hole 52 receiving the joint 50. The joint 50 may be rotatably engaged with each hole 52.

The rod 26 of the actuator 22 is telescopically received in the base 24 of the actuator 22. With reference to FIGS. 3 and 7, the rod 26 telescopically extends from the base 24 when the actuator 22 is activated. The rod 26 may be in contact with the bottom surface 42 of the second bracket 20 when the rod 26 is in the retracted position, as shown in FIG. 3. Alternatively, the rod 26 may be spaced from the bottom surface 42 when the rod 26 is in the retracted position.

The first bracket 16 supports the actuator 22. Specifically, the base 24 of the actuator 22 is fixed to the first bracket 16. For example, the first bracket 16 may include a flange 54, and the actuator 22 may be fixed to the flange 54. The actuator 22 may be fixed to the flange 54 of the first bracket 16 in any suitable manner, e.g., welding, fasteners, etc. As one example, the flange 54 may define a hole 56 (as numbered in FIG. 5) that receives the base 24 of the actuator 22, and the base 24 of the actuator 22 may be fixed to the flange 54 in the hole 56. For example, the actuator 22 may include a plate 82 fixed to the base 24 of the actuator 22. The plate 82 may be fixed to the flange 54, e.g., by welding, fasteners, etc. In addition, or in the alternative to the plate 82, the flange 54 may include a rim 58 fixed to the base 24 of the actuator 22, e.g., by welding, fasteners, etc. In such an instance, the base 24 of the actuator 22 may include a feature (not shown), such as a lip, protrusion, etc., that engages the hole 56 and/or the rim 58 of the flange 54.

The flange 54 of the first bracket 16 may be a reaction surface for the base 24 of the actuator 22. Specifically, for example, the flange 54 may provide a reaction surface for the plate 82. In other words, the flange 45 is fixed relative to the plate 82 of the actuator 22 for supporting the base 24 of the actuator 22 when the actuator 22 is activated, i.e., when the rod 26 is moved from the retracted position to the extended position. The flange 54 of the first bracket 16 may remain stationary relative to the rest of the first bracket 16 as the rod 26 of the actuator 22 moves from the retracted position to the extended position.

The actuator 22 may be a pyrotechnic actuator. For example, the actuator 22 may include a pyrotechnic charge (not shown) between the base 24 and the rod 26. The pyrotechnic charge may be ignited by an electric impulse, as set forth further below. When the pyrotechnic charge is ignited, the pyrotechnic charge combusts to move the rod 26 relative to the base 24 to the extended position. In such an embodiment, the base 24 may define a cylindrical chamber (not shown) and the rod 26 may act as a piston with the pyrotechnic charge between the chamber and the rod 26.

A frangible joint 60 may connect the second bracket 20 and the member 18. The frangible joint 60 is spaced from the rotatable joint 50. The frangible joint 60 may be frangible relative to the second bracket 20 and/or the member 18. The frangible joint 60 is configured to retain the hinge 10 in the undeployed position when the actuator 22 is not activated and is configured to break when the actuator 22 is activated to allow the hinge 10 to move to the deployed position, e.g., to allow the second bracket 20 to rotate relative to the member 18. In other words, the frangible joint 60 rotatably fixes the second bracket 20 relative to the member 18 when the rod 26 of the actuator 22 is in the retracted position. When the actuator 22 is activated, the rod 26 breaks the frangible joint 60 and rotates the second bracket 20 about the member 18 as the rod 26 moves to the extended position. The frangible joint 60 may be sized and shaped, and formed of suitable material, to break as the rod 26 moves from the retracted position to the extended position.

The frangible joint 60 may be a rivet engaging the second bracket 20 and the member 18. The rivet is shown in a pre-assembled state, for example, in FIG. 5. The rivet is shown assembled in FIGS. 3 and 7. The rivet may be sized and shaped, and formed of suitable material, to break as the rod 26 moves from the retracted position to the extended position. Alternatively, or additionally, the frangible joint 60 may be a clinched joint and/or weld, e.g., a metal-to-metal clinched joint and/or weld, between the second bracket 20 and the member 18 configured to break away by the force exerted by the rod 26 of the actuator 22 when the rod moves from the retracted position to the extended position, i.e., when the actuator 22 is activated.

A link 62 may extend from the member 18 to the second bracket 20. The link 62 is spaced from the rotatable joint 50 and extends from the member 18 to the second bracket 20 for limiting rotation of the second bracket 20 relative to the member 18 about the rotatable joint 50, as shown in FIGS. 7 and 8. The link 62 defines the relative position of the second bracket 20 and the member 18 when the hinge 10 is in the deployed position. In other words, the link 62 counteracts the motion of the rod 26 when the second bracket 20 reaches the deployed position after the actuator 22 is activated.

The link 62 is connected to the second bracket 20 and the member 18 at connection points 64. The link 62 may be rotatably and/or slideably engaged with the second bracket 20 and the member 18 at the connection points 64. For example, the link 62 is rotatably connected to the second bracket 20 and is slideably and rotatably connected to the member 18.

The link 62 may define at least one slot 66 that engages the connection point 64 of the member 18 and/or the second bracket 20. For example, the link 62 shown in FIGS. 5, 7, and 8 includes a slot 66 at the member 18 to allow the link 62 to slide, i.e., move translationally, relative to the member 18 as the second bracket 20 rotates relative to the member 18 about the rotational joint 50.

Figure 9:
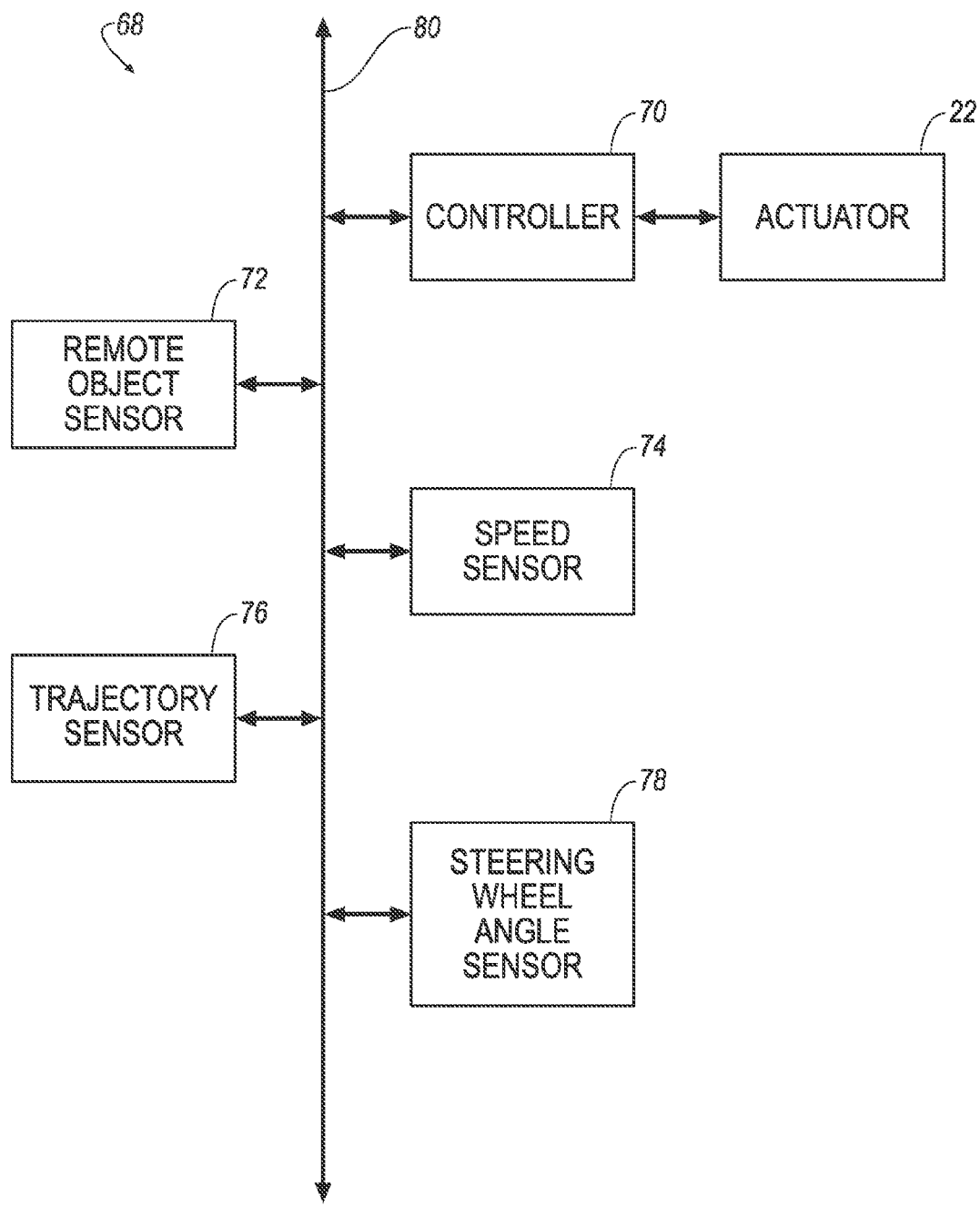
FIG. 9 is a block diagram of a pedestrian impact system.

With reference to FIG. 9, a pedestrian impact system 68 may include the hinge 10, at least one sensor for sensing an impact between the vehicle 14 and a pedestrian, and a controller 70 in communication with the sensor and the actuator 22 for activating the actuator 22, e.g., for providing an impulse to the pyrotechnic charge, when the sensor senses an impact between the vehicle 14 and a pedestrian. The controller 70 is configured to activate the actuator 22 to move the actuator 22 to the extended position when the sensor senses an impact between the vehicle 14 and a pedestrian. With reference to FIG. 9, alternatively or additionally to sensing impact, the pedestrian impact system 68 may be configured to sense the pedestrian prior to impact between the vehicle 14 and the pedestrian, i.e., pre-crash sensing.

The sensor may be configured to sense impact with a pedestrian. Alternatively or additionally, the sensor may be configured to sense a pedestrian pre-impact. The sensor may be configured to sense conditions of the vehicle 14. The sensor may, for example, be further defined as a plurality of sensors of the same or of different types. For example, the plurality of sensors may include a remote object sensor 72 coupled to controller to generate an object signal in the presence of an object, e.g., a pedestrian, within a field of view. The remote object sensor 72 may include one or more types of sensors including radar, lidar, and/or a vision system. The vision system may include one or more cameras, CCD image sensors, and/or CMOS image sensors, etc. The remote object sensor 72 is configured to sense the presence and the distance of an object from the vehicle 14 and may determine characteristics of the detected objects, such as, radar reflective properties, the area, height, and/or width of the object.

With continued reference to FIG. 9, the plurality of sensors may also include a speed sensor 74 for detecting the speed of the vehicle 14, a trajectory detector 76 to measure the trajectory of the vehicle 14, e.g., straight, turning, etc., a steering wheel angle sensor 78 for measuring the rotation of the steering wheel, etc. In addition or in the alternative, the sensors may include any suitable number or type of sensors.

The controller 70 may be a microprocessor-based controller. The sensors are in communication with the controller 70 to communicate data to the controller 70. Based on the data communicated by the sensors, the controller 70 instructs the actuator 22 to activate. Specifically, the controller 70 may include a processor, memory, etc. The memory of the controller 70 may store instructions comprising programming to receive an instruction from the sensors and to activate the actuator 22.

The controller 70 and the sensors may be connected to a communication bus 80, such as a controller area network (CAN) bus, of the vehicle 14. The controller 70 may use information from the communication bus 80 to control the activation of the actuator 22. The actuator 22 may be connected to the controller 70, as shown in FIG. 9, or may be connected to the communication bus 80.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A hinge for a hood of a vehicle, the hinge comprising:
   a first bracket;
   a member coupled to and rotatable relative to the first bracket;
   a second bracket coupled to and rotatable relative to the member;
   a frangible joint between the second bracket and the member; and
   an actuator including a base connected to the first bracket and a rod moveable relative to the base from a retracted position to an extended position in contact with the second bracket.

2. The hinge as set forth in claim 1 wherein the frangible joint is configured to break as the rod moves to the extended position.

3. The hinge as set forth in claim 1 further comprising a rotatable joint between the second bracket and the member spaced from the frangible joint.

4. The hinge as set forth in claim 1 wherein the frangible joint is at least one of a rivet, a weld, and/or a metal-to-metal clinched joint engaging the second bracket and the member.

5. The hinge as set forth in claim 1 wherein the first bracket includes a flange fixed to the base of the actuator.

6. The hinge as set forth in claim 1 further comprising a rotatable joint between the member and the second bracket and a link spaced from the rotatable joint and extending from the member to the second bracket for limiting rotation of the second bracket relative to the member.

7. The hinge as set forth in claim 6 wherein the link is rotatable relative to the member and the second bracket.

8. The hinge as set forth in claim 1 wherein the second bracket includes a connecting feature for connecting to the hood.

9. The hinge as set forth in claim 1 wherein the first bracket includes a connecting feature for connecting to a structure of the vehicle.

10. The hinge as set forth in claim 1 wherein the actuator includes a pyrotechnic charge between the base and the rod.

11. A pedestrian impact system comprising:
a sensor;
a hinge including a first bracket, a member coupled to the first bracket, and a second bracket rotatably coupled to the member;
a frangible joint between the second bracket and the member;
an actuator fixed to the first bracket and moveable to an extended position in contact with the second bracket; and
a controller in communication with the sensor and the actuator.

12. The pedestrian impact system as set forth in claim 11 wherein the controller is configured to activate the actuator to move the actuator to the extended position.

13. The pedestrian impact system as set forth in claim 11 wherein the actuator includes a base connected to the member and a rod movable from a retracted position to the extended position in contact with the second bracket.

14. The pedestrian impact system as set forth in claim 13 wherein the actuator includes a pyrotechnic charge between the base and the rod and the controller is configured to activate the pyrotechnic charge to move the rod to the extended position.

15. The pedestrian impact system as set forth in claim 11 wherein the first bracket includes a flange fixed to the base of the actuator.

16. The pedestrian impact system as set forth in claim 11 wherein the second bracket includes a connecting feature for connecting to the hood.

17. The pedestrian impact system as set forth in claim 11 wherein the first bracket includes a connecting feature for connecting to a structure of the vehicle.

\* \* \* \* \*